United States Patent [19]

Kinnunen, Paavo K. J.

[11] Patent Number: 5,300,329
[45] Date of Patent: Apr. 5, 1994

[54] METHOD AND APPARATUS FOR CONTINUOUSLY PRODUCING A MONOMOLECULAR FILM AT A LIQUID GAS INTERFACE IN A TROUGH BY MEANS OF A ROTATING BARRIER ELEMENT

[76] Inventor: Kinnunen, Paavo K. J., Punarinnantie 4,, SF-02660 Espoo, Finland

[21] Appl. No.: 861,961

[22] PCT Filed: Dec. 14, 1990

[86] PCT No.: PCT/FI90/00298
§ 371 Date: Jun. 15, 1992
§ 102(e) Date: Jun. 15, 1992

[87] PCT Pub. No.: WO91/08841
PCT Pub. Date: Jun. 27, 1991

[30] Foreign Application Priority Data

Dec. 19, 1989 [FI] Finland .................... 896068

[51] Int. Cl.⁵ .................... B05D 1/20
[52] U.S. Cl. .................... 427/430.1; 427/434.3; 118/402
[58] Field of Search .................... 118/402; 427/434.3, 427/430.1

[56] References Cited

U.S. PATENT DOCUMENTS

| | | | |
|---|---|---|---|
| 4,093,757 | 6/1978 | Barraud et al. | 118/402 |
| 4,646,678 | 3/1987 | Grunfeld | 118/402 |
| 4,722,856 | 2/1988 | Albrecht et al. | 427/402 |
| 5,044,308 | 4/1991 | Mojtabaj | 118/402 |

OTHER PUBLICATIONS

English Abstract of 62-274732 (Japan), Nov. 1987.

*Primary Examiner*—Shrive Beck
*Assistant Examiner*—Katherine A. Bareford
*Attorney, Agent, or Firm*—Wolf, Greenfield & Sacks

[57] ABSTRACT

The invention concerns a method for continuously producing a monomolecular film at a liquid-gas interface in a trough, by means of a barrier element rotating horizontally around a vertical shaft, which barrier moves the film from a film formation compartment through a connection zone to a deposition compartment to be deposited onto a substrate. On the opposite side of the barrier with respect to the rotational direction of the barrier element, more film forming substance is added to the liquid surface for forming a new film, which in turn is transferred by a rotating barrier element at a suitable surface pressure to elastically join the first mentioned film as an extension to the same. The invention also concerns a trough apparatus for continuously producing films.

10 Claims, 3 Drawing Sheets

METHOD AND APPARATUS FOR CONTINUOUSLY PRODUCING A MONOMOLECULAR FILM AT A LIQUID GAS INTERFACE IN A TROUGH BY MEANS OF A ROTATING BARRIER ELEMENT This is a national-stage application of PCT/FI90/00298, filed Dec. 14, 1990.

The invention concerns a method for continuously producing a monomolecular film on a liquid surface for the deposition thereof onto a substrate. The invention also concerns an apparatus for continuously producing a monomolecular film.

BACKGROUND OF THE INVENTION

A number of compounds, one end of which is water-soluble and the other end fat-soluble, form onto the interface of a liquid phase and a gas phase an insoluble film having the thickness of one molecule layer. In this film the said amphiphilic compounds are oriented so that the water-soluble end of the compound is in the liquid phase and the fat-soluble end in the gas phase. Irwin Langmuir's original publication (Langmuir, I. (1917) J. Am.Chem. Soc. 39, 1848) describes the principles according to which the orientation of compounds into monomolecular layers is accomplished. Different methods for producing and studying surface films have been widely dealt with in a monograph by George Gaines (Gaines, G. L. , Jr (1966) Insoluble Monolayers at Liquid-Gas Interfaces, interscience Publishers, John Wiley and Sons Inc., New York 1966).

To make monomolecular surface films, the chosen substance, dissolved in a volatile solvent, such as e.g. chloroform or hexane, is spread onto a liquid surface in a trough. The available surface area of the liquid-gas interface is limited by a barrier resting on top of the trough, in contact with the liquid surface, and by means of which the total area of the monomolecular surface film is either decreased or increased. Thus it is possible to regulate the surface tension of the film which is inversely proportional to the surface pressure of the film. The degree of packing, that is the surface density of the molecules of the film, can be measured by using the so called compression isotherm, by determining the surface pressure as a function of the surface area, in order to obtain the surface area/molecule vs. surface pressure. By arranging for a feedback coupling between the surface pressure sensor (usually a Wilhelmy-plate, dunoyu-ring or a Langmuir-barrier) and the motor controlling the movements of the barrier, it is possible to create conditions where the surface pressure of the film, that is the packing density of the molecules, is maintained constant. This is necessary when the film on the surface of the liquid, typically of water, is to be transferred onto a solid substrate to be coated that can be plastic, glass, a silicon wafer, metal or alike. As a result of one transfer, one layer is deposited onto the substrate. This kind of a monomolecular film transferred onto a solid substrate is called a Langmuir-Blodgett film. By repeating the transfer, it is possible to produce multilayer LB-films.

LB-films attract nowadays great interest because they open new technical prospects i.a in the semiconductor industry as resists, in data communication as photoconductors, in laser technique in the SHG formation as well as in the sensor technique. A problem has been that so far there has not been commercially available a so-called continuously operating LB-method and apparatus.

The U.S. Pat. No. 4,093,757 describes an apparatus and a method for depositing a monomolecular layer of an amphiphilic compound onto a substrate. The apparatus consists of two compartments and the compartments are separated by a horizontally rotatable cylinder partly immersed in the liquid and feeding molecules of the amphiphilic compound from one compartment to the other. The continuous deposition and production of the film is performed by adding dropwise, at a predetermined rate, a film compound, dissolved in an organic solvent, into one compartment and continuously transferring the said compound to the other compartment by rotating the cylinder.

The U.S. Pat. Nos. 4,722,856 and 4,783,348 describe an apparatus of another type for continuously producing films, wherein no moving mechanical components are used in contact with the film, but the film is compressed and transported from one region of the trough to another using a continuous medium flow, either by blowing gas above the liquid surface tangentially to the surface or by draining the surface from an upper level to a lower level and continuously adding the film compound to the upper compartment.

SUMMARY OF THE INVENTION

Now a method and apparatus have been invented that permit the continuous production of films by simple means, where the film is controllably deposited onto a substrate and where efficient deposition rates can be attained if desired, e.g. a rate of 30 $M^2/h$. This is attainable by the method in accordance with the present invention for continuously producing a monomolecular film on a liquid surface in a trough for the deposition thereof onto a substrate, the surface area of the film being defined by a barrier element and the side walls of the trough, which method is characterized in that the barrier element, pivoted at one end to perform a horizontally rotating movement along the surface in a film formation compartment of the trough, gradually transfers the film, at a surface pressure suitable for deposition, to a deposition compartment of the trough connected to the film formation compartment over a connection zone, for the deposition of the film onto the substrate, whereby additional film forming substance is introduced to the surface of the liquid in the film formation compartment, on the opposite side of the said barrier element with respect to its rotational direction, for the formation of a new film, which new film, when the radially outer end of the barrier element, due to the further rotational movement thereof, has reached the connection zone and surface contact has been established between the film formation and deposition compartments, at the required surface pressure is transferred by a barrier element to join the said first mentioned film already transferred to the deposition compartment.

According to the most simple embodiment, only one barrier element is used, one end of which is rotatably mounted. To compensate for film deposited onto the substrate in the deposition compartment, the moving barrier gradually pushes the film from the film formation compartment of the trough to the said separate deposition compartment. When the barrier, or specifically its radially outer end section during its rotating movement, has reached the connection zone, the film will be almost completely transferred to the deposition compartment and at this point it will still be separated from the main body of the film formation compartment by the barrier. However, there now follows a stage where the surface in the connection zone will join that of the film formation compartment, due to the further barrier movement. This corresponds substantially to the stage where the barrier is in an angular position where its outer end has moved away from the top of the wall of the film formation compartment into the connection zone. Before this stage is reached, however, enough film substance for forming a new film layer has been added, in accordance with the invention, onto the surface of the liquid in the film formation compartment, on the opposite side of the barrier with respect to the rotational direction. This new film will be subsequently transferred to form an extension to the said first film.

In the embodiment using only one barrier element, the said barrier element will, at the point just prior to the joining of the films, due to the suitable design of the film formation compartment, extend both across the width of the trough in the connection zone and also intersect the film formation compartment, the barrier element thus being simultaneously in contact with the first mentioned film in the deposition zone and the newly formed film in the film formation compartment. When surface contact at the connection zone is established, as stated above, the one and the same barrier elastically moves the new film previously made in the film formation compartment to join the film already in the deposition compartment. The further movement of the barrier then pushes this joined film gradually to the deposition station as it is used for deposition onto the substrate, all the time maintaining the required surface pressure in the film. During each full circle of the barrier, one new film is formed to be transferred into the deposition compartment.

It is to be noted that the geometry of the trough and the barrier element has to be such that at the stage of establishing surface contact, as described above, when the barrier rotates over an angle s, the change in surface area $(dA_1/ds)$ in the connection or deposition zone, has to be equal to or smaller than the change of surface area $(dA_2/ds)$ in the film formation compartment for compensation to take place. However, as the deposition also uses film, the rate of rotation of the barrier at this stage has to be carefully controlled in order to maintain constant surface pressure.

According to one alternative embodiment there are two barriers operated synchronically, whereby the first barrier moves the film to the deposition compartment as the film is used, maintaining constant surface pressure, whereas the second barrier together with the first mentioned barrier together with the walls of the trough define an area of the film formation compartment wherein film forming substance is added to form a new film to be transferred by the said second barrier to the deposition compartment after the first mentioned barrier or rather its outer end has reached the connection zone and surface contact at this point has been established. According to one variation of this embodiment there are three barriers to be operated synchronically, whereby, at each stage of the film formation process, always one barrier is substantially immobile, forming adjacent the connection zone a radially extending separation wall preventing film from slipping from the connection zone back into the film formation compartment, whereas the two other barriers function as described above. When a barrier has passed the connection zone and hits the immobile barrier, the latter starts its rotating movement whereas the first mentioned remains immobile during the following film formation cycle. Naturally the rates of the barriers, and the change in surface area of the films, have to be adjusted so that, when surface contact is established at the connection zone, proper compensation takes place, as stated above, and the films join smoothly.

The apparatus for continuously producing a monomolecular film at a liquid surface according to the invention comprises a trough for receiving the liquid and at least one horizontally rotatable barrier element mounted at one end on a vertical shaft or shafts in contact with the liquid surface and resting on the rims of the trough, which barrier together with the walls of the trough defines the surface area of the film to be formed, and the apparatus is characterized in that the trough includes a film formation compartment comprising the said barrier element(s), for transferring the film from the film formation compartment into a deposition compartment, which joins the film formation compartment over a connection zone, for receiving the film to be deposited onto a substrate.

In its widest sense the apparatus of the invention comprises a two-compartment trough, namely a primary film formation compartment where the barrier element or the barrier elements are mounted at one end and where they perform their rotating movement, and a deposition compartment. According to one advantageous embodiment the shape of the film formation compartment is substantially annular, the deposition compartment joining the film formation compartment substantially tangentially, the connection zone then being the area in the deposition zone lying immediately outside and adjacent the imaginary periphery of the annular film formation compartment. The film formation compartment may also have the shape of an open ring, or rather of a spiral or a hook, the outer extension of the spiral/hook connecting to the deposition compartment. The inner end part of the spiral/hook will then be physically separated from the deposition chamber. The barrier element or elements are mounted from one end in the middle of the ring or spiral. According to one variation of this embodiment, the film formation compartment is substantially shaped like a hooked U, whereby the mounting point of the barrier element or elements during their sweeping circular movement over the leg and the bottom parts of the U, moves back and forth substantially along a rectilinear path between the legs of the U. In this arrangement, the deposition compartment joins to one leg of the U as an extension to the latter. The shape and size of the deposition region are not critical in regard to the invention, as long as it is large enough for allowing deposition of the film onto the substrate and for measuring the surface pressure. The above described spiral or hookshaped embodiments are especially favourable for use with one barrier element only, although it is quite conceivable to use two or more barriers as well. When using the embodiment with only one barrier, the barrier must at least at one stage of the process simultaneously intersect both the inner end of the spiral or hook, and the connection zone, as stated above, in order for the barrier to simultaneously be in contact with the newly formed film as well as the old film and to elastically join these two. The shape of the barrier element may vary, especially the part of the barrier which coincides with the connection zone can be shaped in such a way that surface contact is effected as smoothly as possible.

According to one alternative embodiment the film formation compartment is substantially circular, the barriers being rotatably and coaxially mounted on vertical axes in the center of the circle and extending radially from the center over the walls of the trough. The deposition compartment is advantageously connected to the film formation compartment substantially tangentially, whereby the connection zone of the said compartment will be the area on the outside of and immediately adjacent the imaginary periphery of the film formation compartment. It is, however, preferable in this embodiment to use two independently mounted, but synchronously operated barriers, so that always one of the barriers is transferring a film for deposition, while a new film is being formed in the region defined by the said two barriers, subsequently to be joined as an extension to the previously formed film and then to be moved to the deposition compartment to enable continuous deposition onto the substrate. According to one alternative construction of this embodiment, there are three barriers, whereby always one barrier forms, in close vicinity to the connection zone, an immobile radially extending separating wall. This construction facilitates the complete transfer of the film in a desired manner to the deposition compartment preventing any film substance from escaping back into the film formation compartment at the connection zone. The barriers are in this case preferably constructed so that they diverge symmetrically from the center outwards so that a barrier can rest tightly against another barrier acting as a separation wall, thus promoting the complete transfer of the film to the deposition compartment and making sure that the apparatus remains clean.

Thus the invention makes it possible to make and to transfer a two-dimensional film to be continuously deposited onto a substrate with a device that operates like a pump or bellows. As mentioned above, the surface pressure can be measured e.g., as already known, by using a surface pressure sensor in the deposition compartment of the trough, which sensor is coupled back, e.g. through a computer to a motor controlling the movements of the barrier or barriers, whereby it is possible, with several barriers, to regulate their mutual speeds suitably, taking also into account the rate at which the film forming substance is added to the trough. When using a substantially U-shaped, longitudinal trough, the pivotal point of the barrier can be joined to a conveyor or belt that moves around two wheels located between the legs of the U. Surface pressure measurement and mutual speed regulation of the barriers on the basis of the measured value, as well as the manner of mounting the barriers are known techniques and are not included in this invention.

BRIEF DESCRIPTION OF THE DRAWINGS

The invention is described in more detail in the following, with reference to the attached drawing, wherein FIGS. 3a, 3b, 3c, and 3d show schematically a third embodiment of an apparatus according to the invention, comprising three barriers, wherein FIGS. 3a-3d illustrate different positions of the barriers at different stages during one film production cycle.

DETAILED DESCRIPTION

Figure 1A:
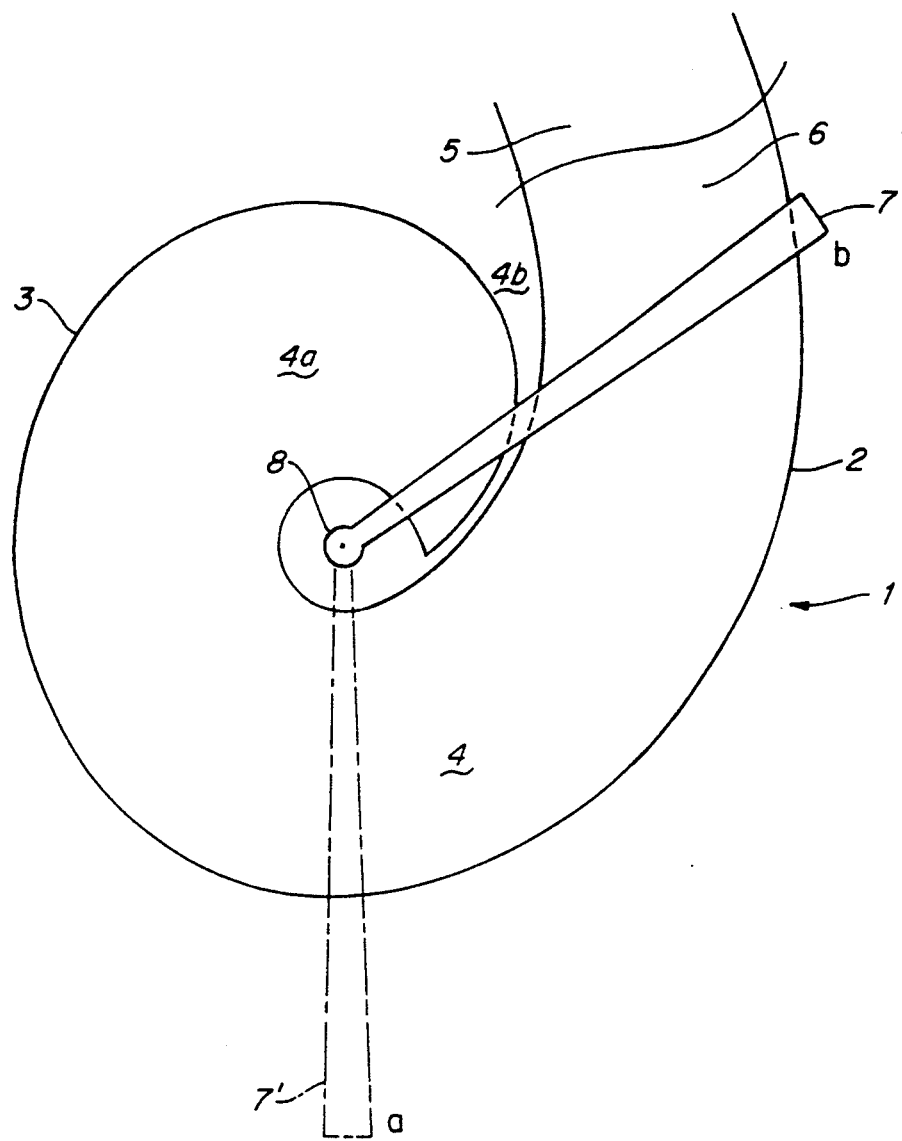
FIG. 1a shows schematically a top view of a first embodiment of the apparatus according to the invention.
Figure 1B:
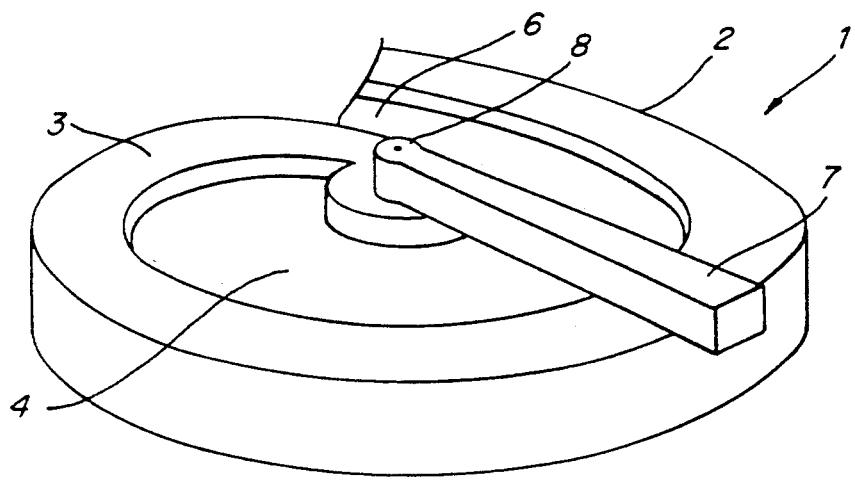
FIG. 1b shows a schematical and perspective view thereof.

FIG. 1a shows schematically a top view of the apparatus 1 of this invention including a trough to--2 and FIG. 1b a perspective view thereof the trough is substantially shaped like a spiral or a hook and suitably produced by machining, e.g. by hollowing a body of a suitable material to form a trough which as a whole is designated by reference numeral 2. The top rim of the trough walls 3 forms the top surface of the trough. The trough is filled up with a liquid used as subphase so that the interface of the liquid supporting the film is just at the same level with the top surface of the trough. The internal surfaces, as well as the top surface of the trough are preferably covered by a hydrophobic material, e.g. by tetrafluoropolyethylene (Teflon). The trough comprises two compartments, the so called film formation compartment 4, mainly corresponding the annular part of the spiral shaped trough, the closed inner end of which being marked with the reference 4a, and the deposition compartment 5, only part of which is shown in the figure, namely mainly the connection zone 6 from the film formation compartment to the deposition compartment. The trough further comprises a barrier 7 that is rotatably mounted on a vertical shaft 8 approximately in the middle of the trough. In FIG. 1a the barrier is shown in two different stages a and b of the film formation process, the one position a of the barrier being marked with a dashed line 7'. The length of the barrier 7 is such that it extends at its every angular position across the liquid surface in the film formation compartment 4. Together with the walls of the trough it defines an area of the liquid surface for the film. The apparatus functions as follows. Let us assume that the barrier is at point a. The film has already been formed at the liquid-gas interface on that side of the barrier which is in the direction of rotation and faces the connection zone. The barrier moves at a given speed, dependent on the deposition speed of the substrate, counterclockwise while maintaining the surface pressure at a value suitable for deposition onto the substrate. Thus the barrier moves the film gradually to the deposition compartment 5. At the same time enough film substance for a "new" film is added on the opposite side of the barrier. When the barrier reaches position b, it extends simultaneously both across the film formation compartment, specifically across its end part 4a, and across the connection zone 6 separated by the wall 4b from the end part 4a. The barrier is at this stage at the same time in contact both with the new film and the film formed during the previous cycle. The further movement of the barrier in the rotation direction makes the outer end of the barrier leave the top of the wall 3 and establishes surface contact between the connection zone 6 and the film formation compartment 4, whereby the new film joins the film already in the connection zone. A smooth joining of the films is secured by regulating the amount of film substance added, as well as the speed of the barrier. From now on the barrier 7 continues to push the joined film in the compartment 4 to the connection zone at the required surface pressure. In this way, by means of the continuous speed-controlled rotational movement of the barrier on the basis of the surface pressure measurement, continuous film production and continuous depose-lion of the film onto the substrate can be attained. The barrier is suitably made of a hydrophilic material, e.g. of Delrin plastic. Due to the material chosen for the trough the barrier slides almost frictionlessly along the top surfaces of the trough apparatus.

Figure 2:
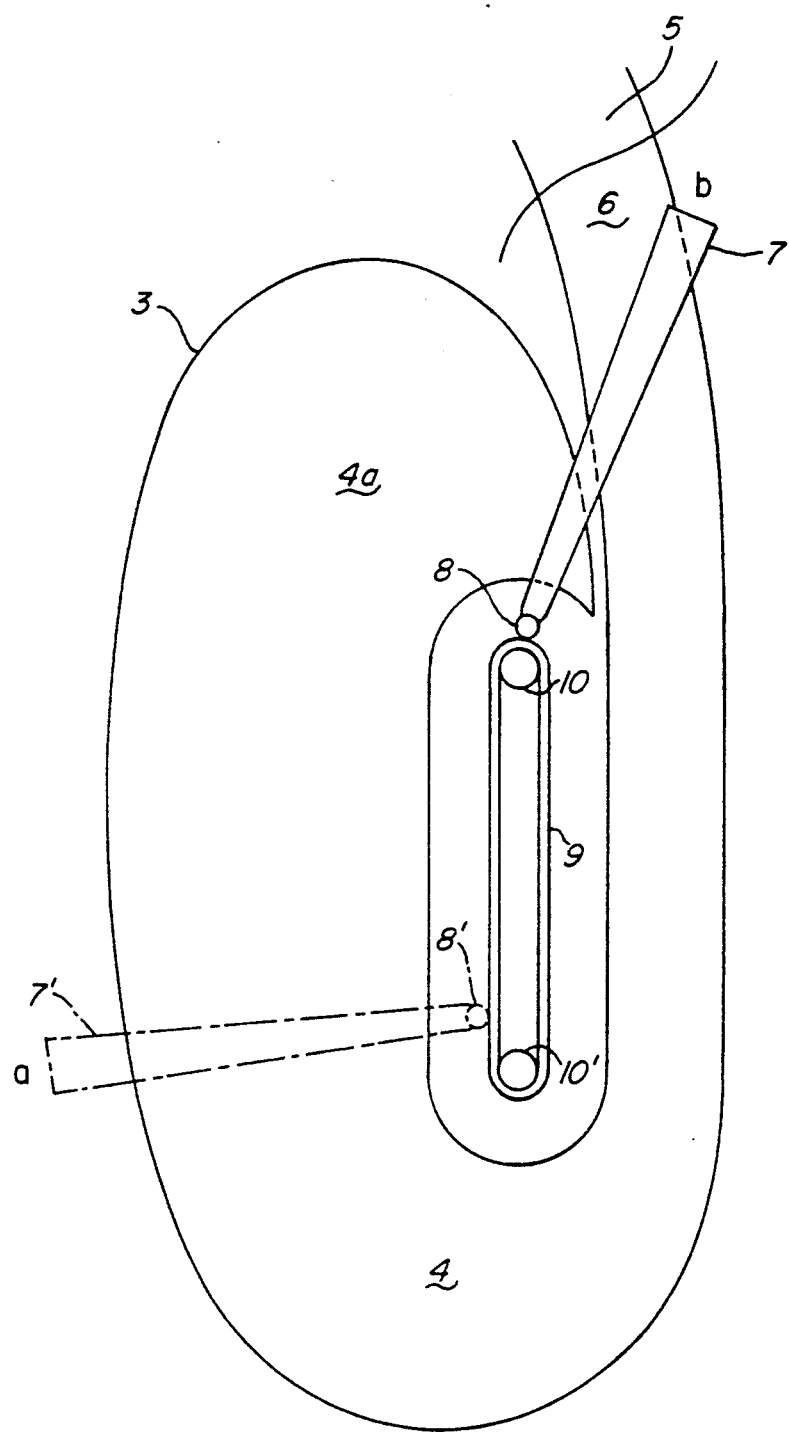
FIG. 2 shows schematically a top view of a second embodiment of the invention.
Figure 3A:
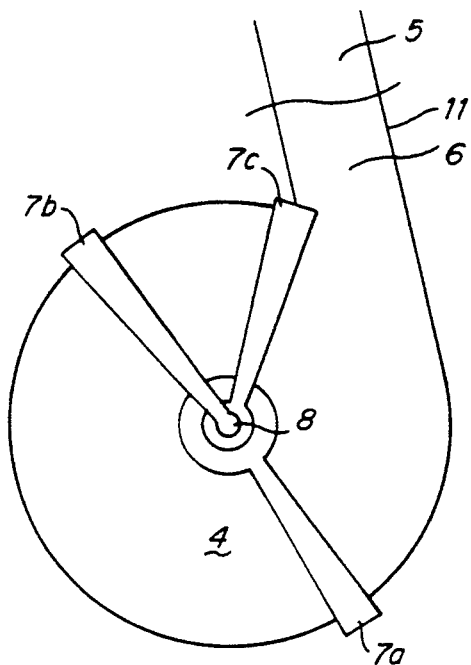
Figure 3B:
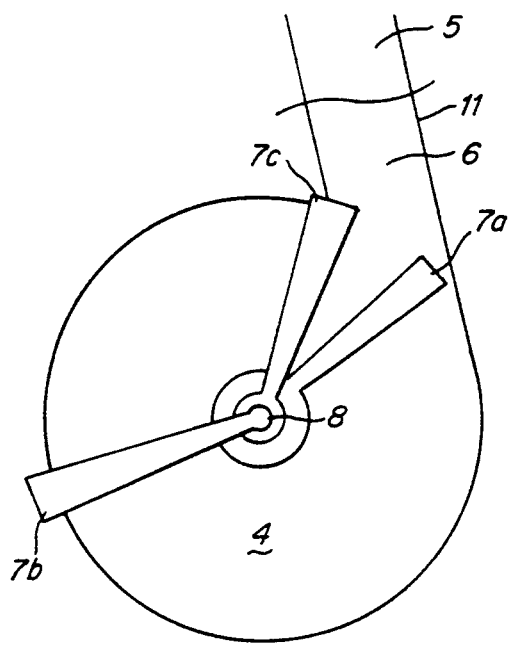
Figure 3C:
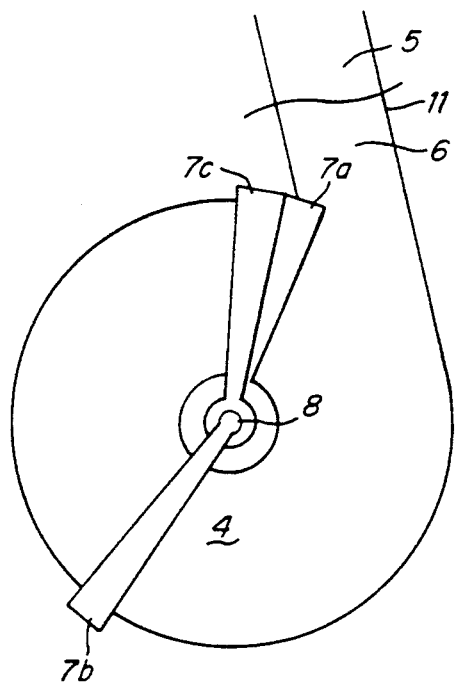
Figure 3D:
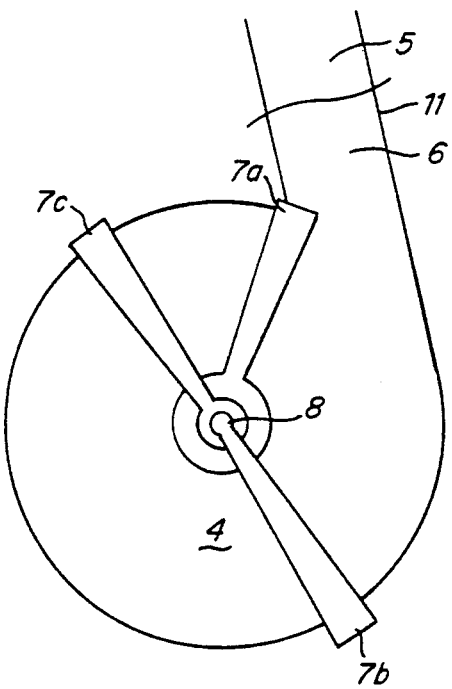

According to an alternative embodiment operating substantially on the same principle, and schematically described in FIG. 2 with the same reference numbers as in FIG. 1, the trough is shaped like a longitudinal U, comprising a film formation compartment 4 and a deposition compartment 5 and a connection zone 6 connecting these two. The most essential difference between this and the embodiment according to FIG. 1 is the path of the barrier 7 or its fastening point 8. In this embodiment the barrier is fixed at one end 8 to a conveyor or belt 9 which moves along a longitudinal path around two wheels 10 and 10'. The conveyor 9 can be any, for this purpose suitable conveyor, e.g. a chain conveyor, whereby the wheels 10, 10' may accordingly be toothed wheels or similar. While the pivotal point 8' is substantially moving back and forth between the two legs of the U, the barrier 7 makes a longitudinal, rotational movement sweeping over the film formation compartment 4 in a manner corresponding to the embodiment according to FIG. 1. Two alternative positions of the barrier have been shown at point a (with barrier 7' and pivotal point 8' shown in dashed lines) and point b, where the barrier is in the connection zone just before surface contact is established and the films on both sides of the barrier join. In this position the barrier intersects both the end part 4a of the film formation compartment and the connection zone, as described above.

One further embodiment according to the invention is described in FIGS. 3a–3d, Corresponding parts have been marked, where applicable, with the same reference numbers as in FIGS. 1 and 2. The apparatus comprises three synchronously operated barriers 7a, 7b and 7c, the movement of which is controlled by means of the surface pressure measured in the deposition compartment 5. In this embodiment the trough is substantially circular and the barriers coaxially but independently mounted on a vertical shaft at 8. The deposition compartment, or its one wall 11, is connected over the connection zone 6 substantially tangentially to the film formation compartment. At the stage of the film formation process according to FIG. 3a, the barrier 7a is moving a film in its rotating direction to the deposition compartment. Before the barrier 7a has reached the connection zone, film substance is added to the other side of the barrier 7a, onto the liquid surface in the surface area defined by the barriers 7a and 7b. The barrier 7c is during this cycle immobile acting as a separation wall adjacent the connection zone 6. In the situation according to the FIG. 3b, the barrier 7a has already approached the connection zone and just established surface contact between this and the film formation compartment, and the barrier 7b has correspondingly moved a little forward to maintain the required surface pressure. The films on both sides of the barrier 7a are elastically joined at the correct surface pressure. At the stage according to the FIG. 3c, the barrier 7a has passed over the connection zone to rest against the barrier 7c. Thus any film material between the barriers 7a and 7c is forced to move to the connection zone. At the same time the barrier 7b has moved forward and is in turn pushing the joined film via the connection zone to the deposition compartment. During the next cycle the barrier 7a functions as a separation wall, the barrier 7c in turn starts a circular path and during this cycle film forming substance is added to the surface region between the barriers 7b and 7c. As illustrated by the figures, the situation according to the FIG. 3d corresponds with the situation of the FIG. 3a, except that the barriers have changed places. In this embodiment, the barriers are preferably slightly diverging from their pivotal points, thus forming sharp-angled, equilateral triangles that rest tightly against the side of another barrier.

This embodiment can also be realized by an arrangement where there are only two barriers and the immobile separation barrier is omitted. In this case, however, some film might slip from the connection zone back to the film formation compartment, whereby the liquid surface has to be cleaned every now and then, e.g. by sucking possible unwanted materials away from its surface. In this embodiment it is advantageous that the radially outer end of the barrier is broad enough so that its end surface, at least in some position of the barrier, intersects the connection zone and momentarily cuts off surface contact between the connection zone and the film formation compartment, the end surface thus acting as a separation wall. The film forming substance is added to the liquid surface e.g. by a computer controlled liquid feeder. The point of the applicator touches the liquid-gas interface during the application. The point of the applicator is moved away from above the trough by a computer controlled electric motor, to leave room enough for the barrier movement.

Operation of the apparatus is controlled by a microprocessor connected between the surface pressure sensor and the electric motor or motors driving the barrier system, which microprocessor also controls, also by an electric motor, the feeder of the film forming substance and its applicator part. To indicate the barrier position (surface area of the film) the barrier is advantageously feedback connected with the microprocessor. The surface pressure is advantageously made to act on the electric motor which drives the barrier which at the moment is in the process of moving a film to the deposition compartment. The angular speed of the barrier following the first mentioned barrier is determined according to the speed (position) of the first mentioned barrier and possibly according to the rate of addition of the film forming substance. Anyway, the rate of addition is preferably regulated to a constant and optimal value for each system. If necessary, the system can also be equipped with a suction apparatus to clean the surface from remnants of film forming substances.

What is claimed is:

1. Method for continuously producing a monomolecular film on a liquid surface in a trough for the deposition thereof onto a substrate, a surface area of the film being defined by a barrier element and side walls of the trough, the method comprising the steps of: pivoting the barrier element at one end to perform a horizontally rotating movement along the surface in a film formation compartment of the trough, gradually transferring the film by means of the barrier element, at a surface pressure suitable for deposition, to a deposition compartment of the trough connected to the film formation compartment over a connection zone, for the deposition of the film onto the substrate, and introducing additional film forming substance to the surface of the liquid in the film formation compartment, on the opposite side of the barrier element with respect to its rotational direction, for the formation of a new film, which new film, when the radially outer end of the barrier element, due to the further rotational movement thereof, has reached the connection zone and surface contact has been established between the film formation and deposition compartments, at the suitable surface pressure is transferred by the barrier element to join the first mentioned film already transferred to the deposition compartment.

2. Method of claim 1, wherein the pivoted end of the barrier element moves along a substantially longitudinal path when the barrier element performs its rotational movement.

3. Method of claim 1 or 2, wherein there is only one barrier element, which at least in one position during its rotational movement is in contact with the film both in the film formation compartment and in the connection zone.

4. Method of any of the claims 1-2, wherein there are a plurality of barrier elements and mutual rotational speeds of the barrier elements are regulated on the basis of a surface pressure measured at the deposition compartment.

5. Apparatus for continuously producing a monomolecular film at a liquid surface, which apparatus comprises a trough having walls and a rim for receiving the liquid and at least one horizontally rotatable barrier element mounted in contact with the liquid surface on the rim of the trough, which barrier element together with the walls of the trough defines a surface area of the film to be formed, and wherein the trough includes a substantially annular film formation compartment and a separate deposition compartment which extends substantially tangentially from the film formation compartment over a connection zone, and wherein the at least one barrier element is positionable to contact both a new film in the film formation compartment and the film formed during a previous cycle in the connection zone to enable transfer of the film from the film formation compartment over the connection zone into the deposition compartment to be deposited onto a substate.

6. Apparatus of claim 5, wherein the film formation compartment is substantially U-shaped and one end of the barrier element is mounted at a point that during the rotational movement of the barrier element moves along a substantially longitudinal path back and forth between the legs of the U.

7. Apparatus of claim 5, wherein the film formation compartment is substantially spiral-shaped and wherein the barrier element in at least in one of its positions reaches both across the breadth of the film formation compartment and across the connection zone.

8. Apparatus of claim 5, wherein the film formation compartment is substantially circular and there are at least two barrier elements independently and coaxially mounted, whereby at each stage of the film formation process a first barrier element defines together with the walls of the deposition compartment and the connection zone, a surface area of the film to be deposited onto the substrate, and a second barrier element together with the first barrier element in the film formation compartment define a surface area of a film to be subsequently deposited onto the substrate.

9. Apparatus of claim 8, wherein there are three barrier elements, the third barrier element being at every stage of the film formation process immobile.

10. Apparatus of claim 5, wherein the film formation compartment is substantially circular and at least a portion of the barrier element acts as a separation wall between the film formation and deposition compartments.

* * * * *

UNITED STATES PATENT AND TRADEMARK OFFICE
CERTIFICATE OF CORRECTION

PATENT NO. : 5,300,329

DATED : April 5, 1994

INVENTOR(S) : Kinnunen

It is certified that error appears in the above-indentified patent and that said Letters Patent is hereby corrected as shown below:

Col. 6, line 67. -   delete "depose-lion" and substitute -- deposition --

Signed and Sealed this

Twenty-eighth Day of November 1995

Attest:

BRUCE LEHMAN

*Attesting Officer*   *Commissioner of Patents and Trademarks*